United States Patent [19]

Berneking et al.

[11] Patent Number: 4,461,511
[45] Date of Patent: Jul. 24, 1984

[54] VEHICLE SEAT FITTING

[75] Inventors: Hans-Jürgen Berneking, Porta Westfalica; Wilhelm Rabe, Bad Eilsen, both of Fed. Rep. of Germany

[73] Assignee: P.A. Rentrop, Hubbert & Wagner Fahrzeugausstattungen, Stadthagen, Fed. Rep. of Germany

[21] Appl. No.: 260,927

[22] Filed: May 6, 1981

[30] Foreign Application Priority Data

May 7, 1980 [DE] Fed. Rep. of Germany ....... 3017433

[51] Int. Cl.³ ............................................. A47C 1/032
[52] U.S. Cl. ..................................... 297/355; 297/379
[58] Field of Search ................ 297/379, 354, 355, 346

[56] References Cited

U.S. PATENT DOCUMENTS

| 3,185,525 | 5/1965 | Welsh | 297/379 X |
| 4,113,308 | 9/1978 | Werner et al. | 297/379 X |
| 4,312,537 | 1/1982 | Lindenberg | 297/379 X |

Primary Examiner—William E. Lyddane
Attorney, Agent, or Firm—Penrose Lucas Albright

[57] ABSTRACT

A vehicle seat which incorporates provision for fore and aft adjustment of the seat as a whole, height adjustment of the seat part and angular adjustment of the back rest, includes a fitting which enables these adjustments to be made, but prevents inadvertent adjustment.

The fitting includes a lever and a tongue pivotal on a plate secured to the seat, the tongue being arranged to co-operate with a latch or alternatively an arrest device to prevent pivoting of the tongue and hence of the lever. By immobilizing the lever the adjustments to the seat are prevented.

14 Claims, 9 Drawing Figures

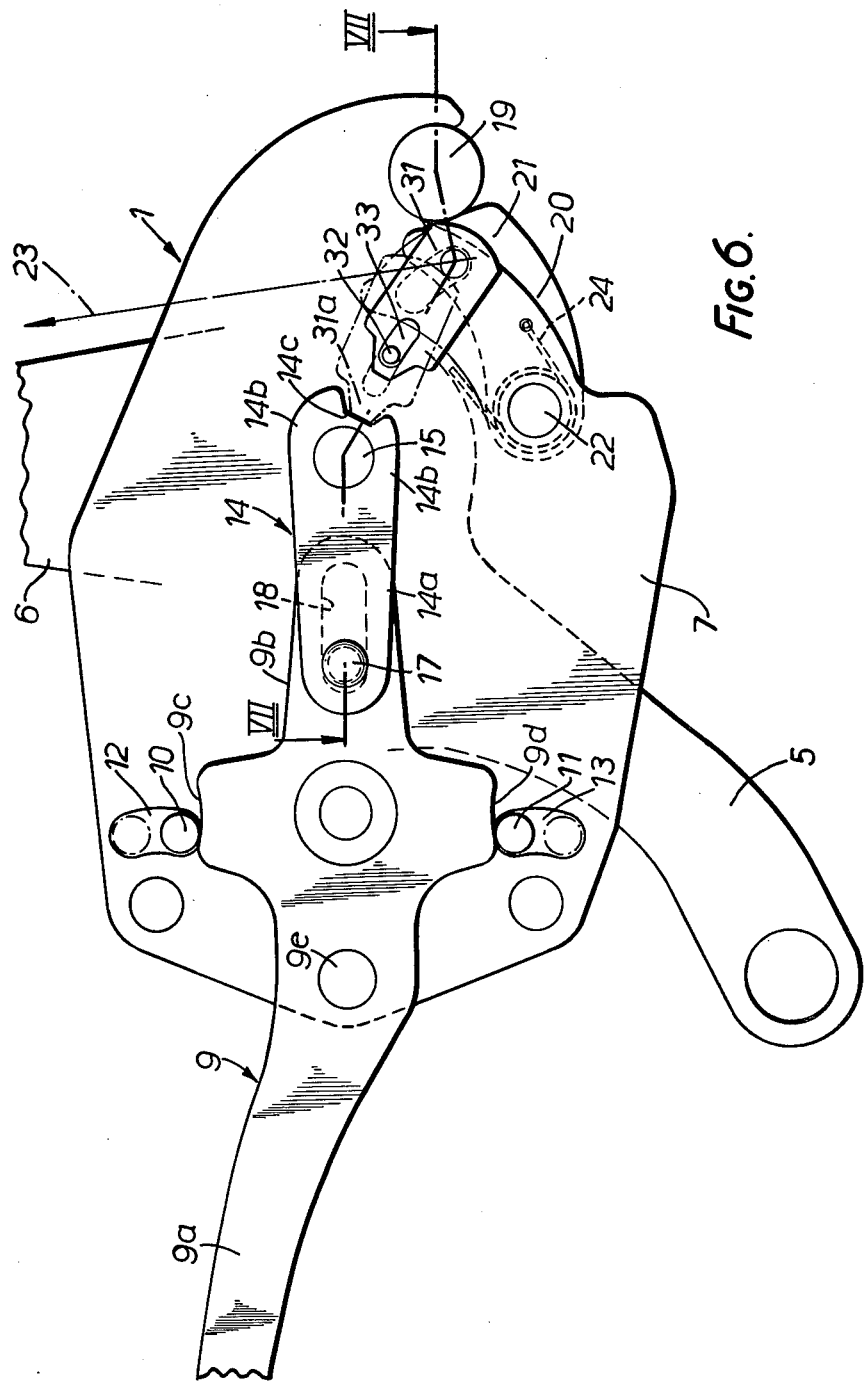

VEHICLE SEAT FITTING

BACKGROUND OF THE INVENTION

1. Field of the invention

The invention relates to a seat fitting, in particular for incorporation as a part of a vehicle seat. Seats of this kind consist of an under frame and an upper frame, for the support of the height adjustable seat part and with a back rest which can be adjusted angularly, which is pivotally mounted at both sides of the seat part by fittings, with a movable lever pivotally mounted on the fitting, from a neutral position into two end positions, by which in the one end position the seat part is adjustable for height and in the other end position the inclination of the back rest is adjustable.

2. Summary of the Prior Art

In one such previously proposed construction in the seat as a whole is capable of being moved in the direction of travel after releasing a lock, the seat part during this movement being mounted for forward movement by parallel links mounted in the base together with the back rest. During this movement the danger arises, that if the release level is unintentionally, for example by striking against any part of the vehicle, moved into one of the two end configurations, the result will be that the actuating mechanism for the height adjustment of the seat or the change in the inclination of the back rest is released. By this means the back rest may strike any person seated rearwardly during such angular displacement, which will take place towards the floor of the vehicle. As a result of this fault, the possibility of injuries cannot be excluded.

One object of the present invention is to provide a seat fitting which overcomes this fault and makes provision for preventing unintentional release of the lever and thus of the seat adjustment or the back rest adjustment during the movement of the back rest in the forwards direction.

SUMMARY OF THE INVENTION

According to the present invention there is provided in a vehicle seat fitting, the seat incorporating means for height adjustment of the seat part, tilting motion of the back rest and fore and aft adjustment of the seat as a whole, a lever pivotal from a neutral position selectively into one or other of two end positions, one said end position enabling height adjustment of the seat part, and the other said end position enabling adjustment of the inclination of the back rest, a locking means for restraining the pivotal lever from pivotal motion, and arrest means functionally connected with the locking means and operative to arrest motion of the pivotal lever whenever the locking means are in their release configuration so as to prevent movement into either of said end positions.

As soon as the lock is released for forwards motion of the seat, the lever is positively arrested in its neutral outer operational position, so that any undesired excess motion of the same into one of the two operational positions (end positions) is positively avoided.

This overall concept can be applied to advantage in various preferred embodiments. According to a first preferred embodiment, in which the fitting consists of a pair of plates receiving an upright member of a back rest therebetween, the pivot lever, constructed as a two-armed lever, is pivoted to the one plate of the fitting, a tongue being mounted on the fitting and pivotal according to the degree of movement of the pivotal lever into the end position, which with its one end is connected through a longitudinal slot-pin-connection with the one lever arm of the pivotal lever.

Preferably, the longitudinal slot-pin-connection has its pin connected with the tongue, which engages in a slot of the lever arm of the lever.

Thus a pin is mounted on the upper frame in the zone of the back rest, which moves during the pivotal motion of the same into a recess in the fitting.

The lock, therefore, consists of a lock latch pivoted to one of the plates of the fitting, which by means of a tension cable guided in the frame of the back rest is convertable into the release configuration. This lock latch is subject to the action of a return spring, which returns it into the release configuration in the recess in the fitting.

According to a preferred embodiment the tongue is constructed as a two-armed lever. For this purpose a recess is provided in the one arm of the tongue, in which the arrest device engages positively.

The arrest device consists of a pin engaging in the recess of the tongue. The pin is connected with the lock latch.

According to a further connection, the pin is arranged on a pivot pin subject to the action of a return spring, which in the arrest configuration is held by the pin connected with the lock latch. Preferably the arrest device consists of a slide connected and positively guided with the lock latch. This positive guidance consists of a pin and slot guide, the pin being connected with one of the plates of the fitting and engaging in a slot, which is provided at one end of the slide.

According to a further embodiment, in which the tongue is constructed as a single armed lever, the tongue being connected with a pin rotatably mounted in the fitting, as a result of which the lock latch is in pivotal connection with a link.

Preferably the link is linked to the rotatable pin, this pin being provided with a flattened part, which in the arrest configuration of the lever positively engages in a corresponding recess in the link.

By means of the features in accordance with the invention there is provided with relatively simple and also operationally safe means a protection which in the case of forward movement of the seat, an actuation of the lever and thus an adjustment of the height of the seat or of the inclination of the back rest can be safely excluded.

BRIEF DESCRIPTION OF THE DRAWINGS

FIG. 6 is a side view to, an enlarged scale, of a further embodiment of a fitting in accordance with the invention.

DESCRIPTION OF THE PREFERRED EMBODIMENTS

Figure 1:
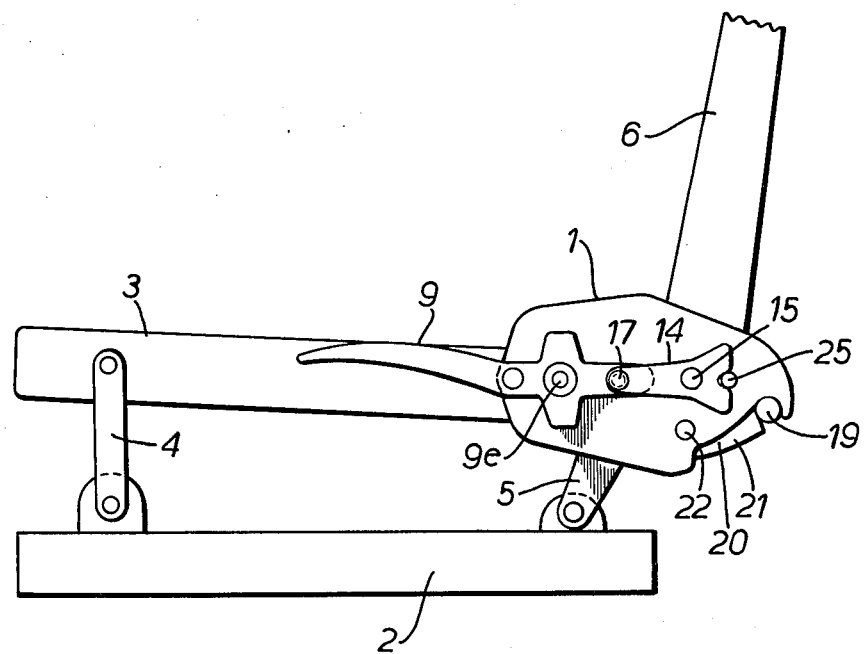
FIG. 1 is a fragmentary view of a vehicle seat without upholstery incorporating a fitting in accordance with the invention.

Fittings 1 in accordance with the invention are intended to be incorporated in vehicle seats with height-adjustable seat parts and provision for adjustable inclination of the back rest. FIG. 1 shows such a seat as a fragmentary side view. The underframe of the base, for example the seat adjustment runner assembly, is denoted by 2, while the upper frame of the base, for example the seat frame is indicated by 3. Springing of any appropriate kind is provided in the upper frame 3, which for the sake of clarity is not further illustrated. The upholstery covers the springing, and is likewise not shown. The upper frame 3 is articulated to the underframe 2 by pairs of substantially parallel links 4,5. One substantially upright member of the back rest of the seat is denoted by 6.

Since the construction of such seats is known per se, further specific details can be omitted.

FIGS. 2 to 9 show various fittings in accordance with the invention to an enlarged scale. The fitting 1 consists of a pair of plates 7,8 mounted on the one upright member 6. A lever 9 is pivoted on the plates 7, the pivot pin being indicated by the reference numeral 9e. This lever is constructed as a two-armed lever, and the two arms 9a and 9b can be swung from a neutral position illustrated in the drawing (outer operational position) into either of two end positions. In the neutral, intermediate, position the two projections 9c, 9d are applied against stops 10,11 which are mounted on respective pivotal links 12,13 arranged between the two plates 7,8. In the respective end positions of the lever 9 the stops 10,11 assume the positions illustrated in the drawing by chain lines. By pivotal movement of the lever 9, for example in the clockwise sense (as viewed in FIG. 2) the link 13 is likewise turned in the clockwise sense and renders possible the adjustment of the inclination of the back rest. If the pivotal lever 9 is again swung into its neutral, intermediate, position then the back rest is arrested in the desired position. Since adjustment mechanisms of this kind are known in themselves, and moreover the invention is not related to the particular construction thereof, further details can be omitted.

Figure 2:
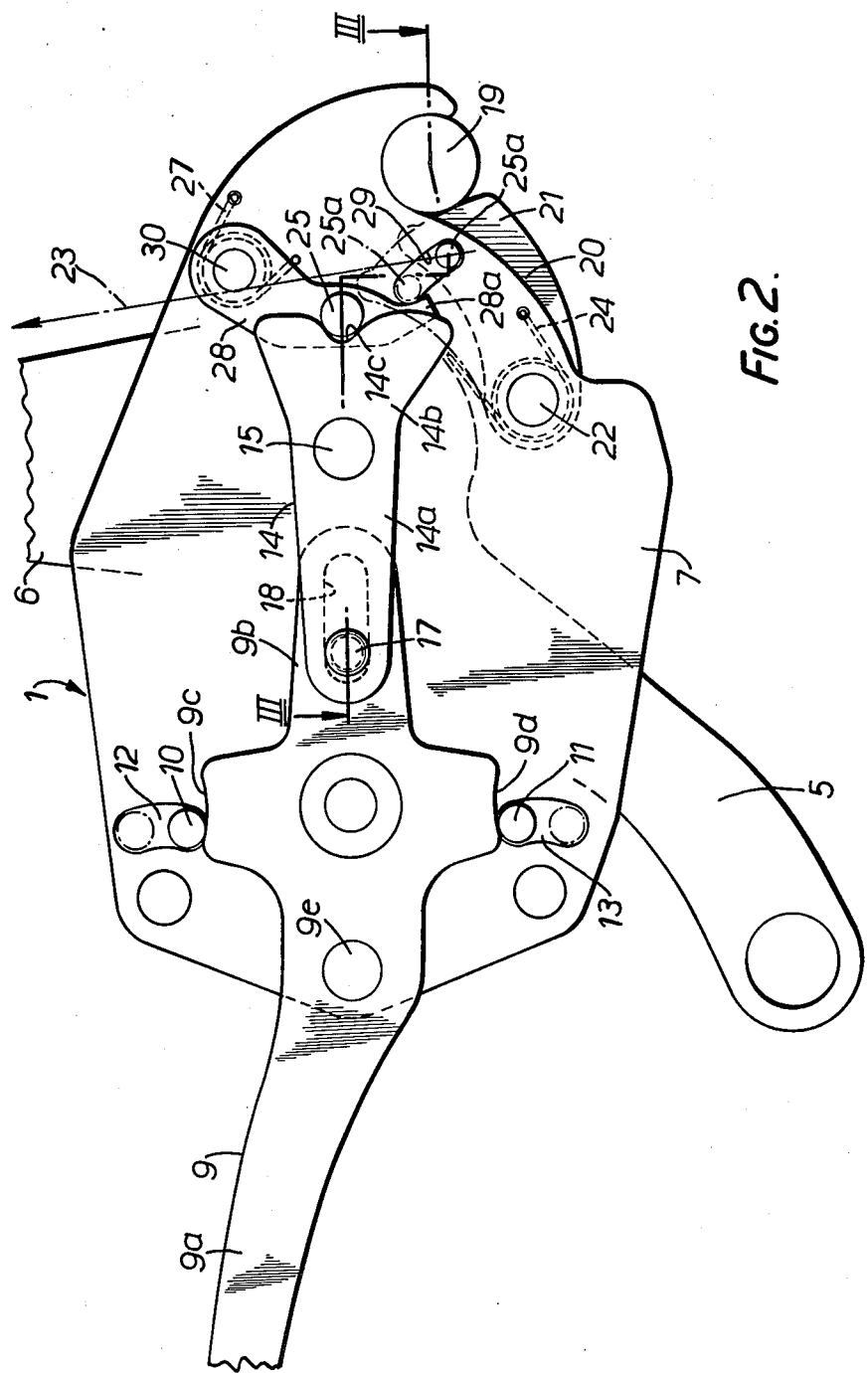
FIG. 2 is a view, to an enlarged scale, of a first embodiment of fitting in accordance with the invention.

In contrast, if a pivotal movement of the lever 9 is effected in the counter-clockwise sense (as shown in FIG. 2), a corresponding swinging of the link will take place and this renders possible adjustment of the seat height by appropriate pivoting of the parallel links 4 and 5. If then the pivotal lever 9 is swung back to its neutral, intermediate, position, then the underframe 2 of the seat part is held in the desired position. Also such adjustment mechanisms are known in themselves and do not form the subject of the invention, so that further details can be omitted.

A tongue 14 is pivoted on the fitting 1 into the respective end positions according to the degree of movement of the pivotal lever 9. This tongue 14 is connected for rotation with a pin 15, which is connected with a transverse rod 16 (chain lines) and is subject to the action of a torsion spring. During the motion of the lever into the one end position the stressed torsion spring effects a pivotal movement of the back rest forwardly. The tongue 14 is constructed as a two-armed lever with the two lever arms 14a and 14b, the one arm 14a being connected through a slot and pin connection with the lever arm 9b of the lever 9. The slot and pin connection has a pin 17 connected with the tongue 14, and engages in a longitudinal slot 18 (chain lines) of the lever arm 9b of the lever 9. By this means pivoting of the lever 9 relative to the tongue 14 is possible.

A pin 19 is provided on the upper frame 3 in the zone of the back rest, which during the forwards motion of the seat moves into a recess 20 in the fitting 1 (FIGS. 1 and 2).

A lock constructed as a lock latch 21 is pivoted on the plate 7 of the fitting 1, the pivot point being indicated at 22. This lock latch 21 can be moved into the release position by a tension cable 23 (indicated by a chain line) guided in the frame of the back rest, while the locked condition is indicated with a continuous line. In the release condition the lock latch 21 is released from the recess 20, so that the back rest can be tilted forwardly in a stepless manner, which, for example, is required if the seat is to be laid flat on the floor of the vehicle.

The lock latch 21 is subject to the action of a return spring 24, which returns it to the release condition in the recess 20 of the fitting 1.

An arrest device is functionally connected with the lock latch 21, which in the release condition of the lock arrests the pivotal lever 9 in its neutral position (intermediate position) or in other words its non-operational condition. A recess 14c is provided in the one arm 14b of the tongue 14, in which the arrest device positively engages. In the embodiment illustrated in FIGS. 4 and 5 the arrest device consists of a pin 25a connected with the lock latch 21, which is guided in a recess 26 in the plate 7 of the fitting 1. By the engagement of this pin 26 in the recess 14c, the tongue 14 and thus also the pivotal lever 9 connected therewith are secured against pivotal motion. During the forward movement of the seat it is thus impossible at the same time to effect actuation of the seat height adjustment or the adjustment device for the change of the inclination of the back rest.

Figure 3:
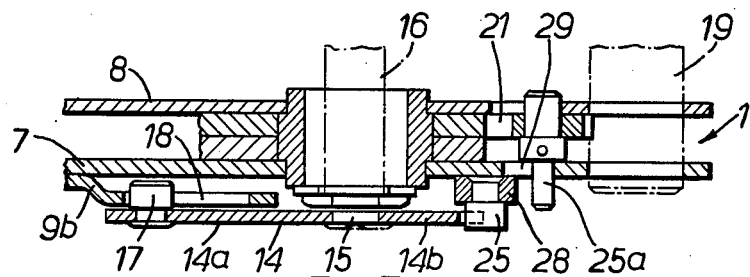
FIG. 3 is a section along the line III—III of FIG. 2.
Figure 5:
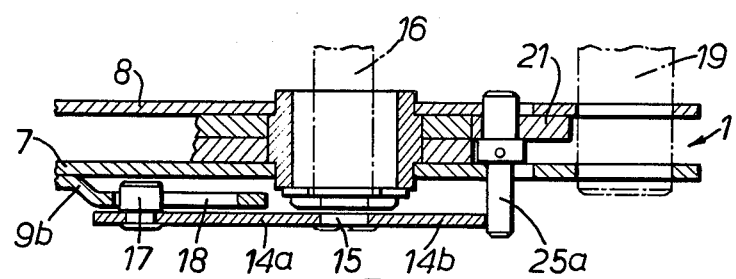
FIG. 5 is a section on the line V—V in FIG. 1.

According to the embodiment of FIGS. 2 and 3 the pin 25 is arranged to be subject to the action of a pivotal latch 28 itself biased by a return spring 27, which is maintained by the pin 25a connected with the lock latch 21. This pin 25a is guided in the slot 29 of the plate 7 of the fitting 1. The pivotal latch 28 carries at its end lying opposite to the pivot pin 30 a nose 28a against which the pin 25 is applied in the arrest position of the tongue 14 and thus of the pivotal lever 9.

Figure 7:
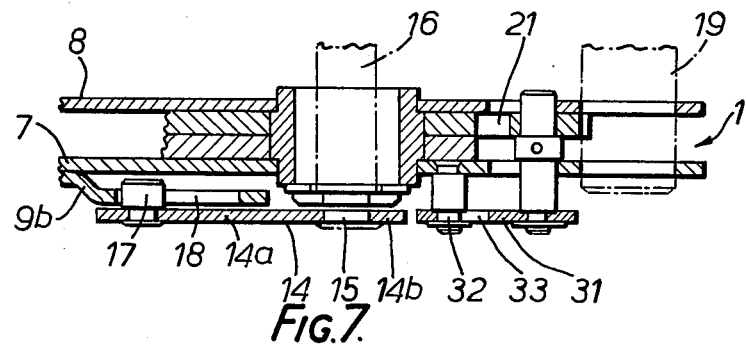
FIG. 7 is a section along the line VII—VII of FIG. 6.

In the embodiment of FIGS. 6 and 7 the arrest device consists of a slide member 31 positively linked with the lock latch 21, which has at its one end a wedge-shaped projection 31a, which engages in the recess 14c in the one arm 14b of the tongue 14. Positive guidance is effected thus by means of a slot-pin-guide, while the pin 32 connected with the plate 7 of the fitting 1 engages in a slot 33, which is provided at one end of the slide member 31.

Figure 9:
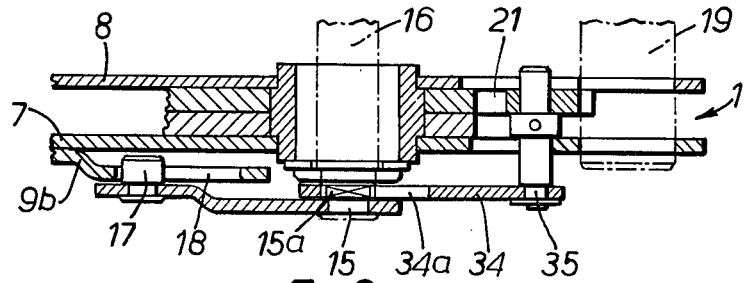
FIG. 9 is a section on the line IX—IX of FIG. 8.
Figure 4:
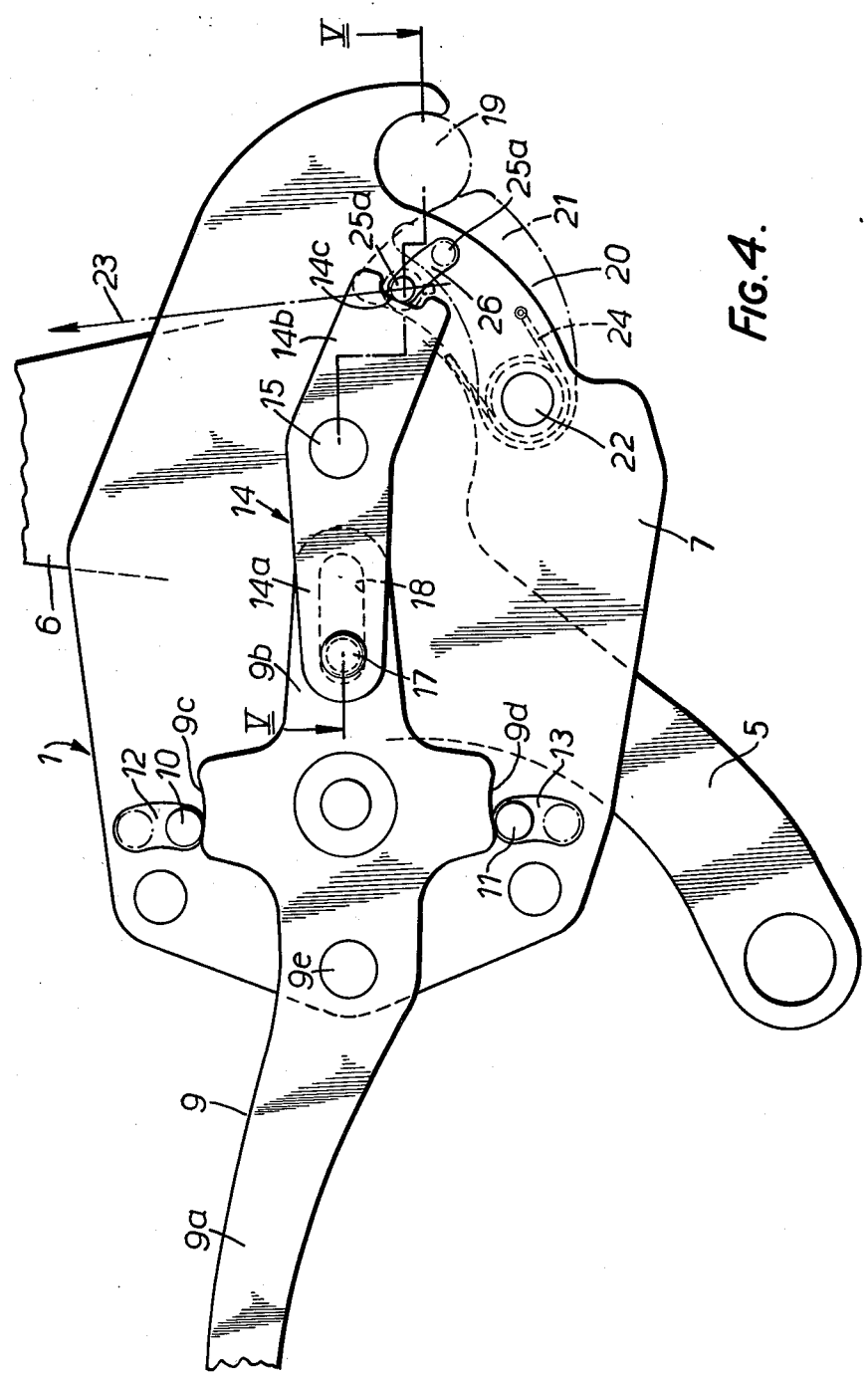
FIG. 4 is a side view, to an enlarged scale, of a further embodiment of a fitting in accordance with the invention.
Figure 8:
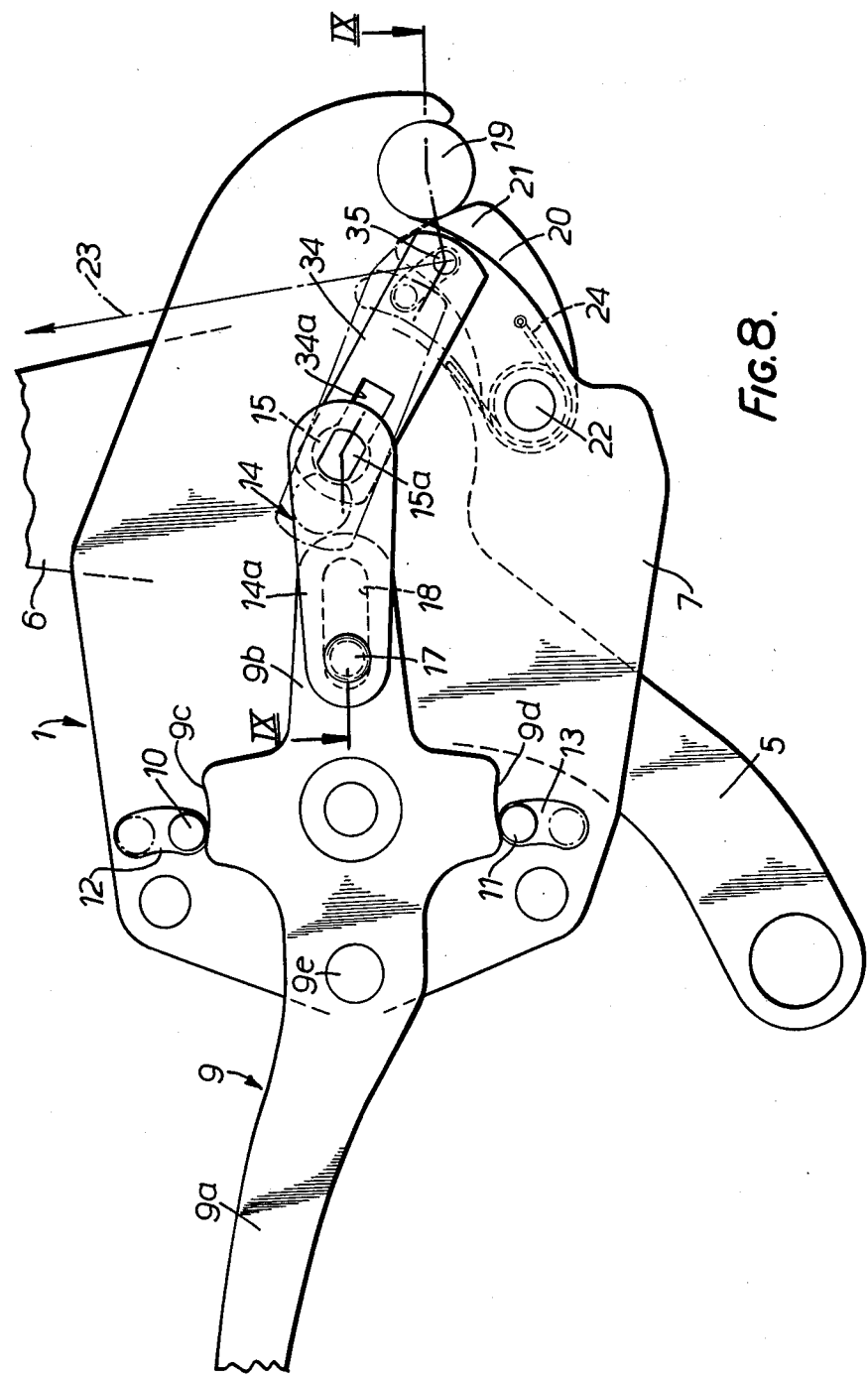
FIG. 8 is a side view of a further embodiment of a fitting in accordance with the invention.

According to the embodiment of FIGS. 8 and 9 the tongue 14 is constructed as a single-armed lever and is fast for rotation with the pin 15, the lock latch 21 being characterized by a link 34 in pivotal connection therewith, of which the pivot point is denoted by 35. This link 34 is pivoted to the pin 15, on which pin 15 a flattened part or flat 15a is provided, which in the arrest configuration of the lever 9 positively engages in a corresponding recess 34a in the link 34. If thus the lock latch 21 is moved into the release position illustrated by a chain line so that the recess 20 is released and the forwards movement of the seat is permitted, then both flattened parts 15a of the pin 15 are pressed into the recess 34a and thus prevent the pin 15 and also the tongue 14 as well as the pivotal lever 9 connected therewith from performing pivot movement. Also in this way there is provided during the forwards motion a degree of security against actuation of the pivot lever 9 and thus release the mechanism for height adjustment of the seat or respectively change in the inclination of the back rest.

The manner of operation of the fitting will be explained with reference to the embodiments according to FIGS. 2 and 3. The manner of operation of the remaining embodiments will be apparent to the man skilled in the art on the basis of the explanations given, without any further need for setting out the details.

If the lock latch 21 lies in the position indicated in FIG. 2 by chain lines, then a forward motion of the seat is to this extent impossible as it lies in the recess 20 of the two plates 7 and 8 and thus motion is prevented by the pin 19. The actuation of the pivotal lever 9 is to this extent possible without further action, pivotal lock 28, being by no means subject to the action of the pin 25a, can be pivoted in the counter-clockwise sense, so that pivotal movement of the tongue and thus of the lever 9 connected therewith can be carried out. It is also important in this case that the pin 25 during pivotal motion of the tongue 14 can be moved out of the recess 14c of the tongue 14, and thus cannot exert a locking function.

If, in contrast, the tension cable 23 guided in the frame of the back rest is actuated, then the lock latch 21 is pivoted in the anti-clockwise sense into the release condition, (broken lines in FIG. 2), in which it disengages from the recess 21 in both the plates 7 and 8 of the fitting, so that now the seat as a whole can be tilted in a stepless manner in a forwards direction. At the end of a pivotal motion of the lock latch 21 in which in FIG. 2 of the drawings there is shown in broken lines the pin 25a abutting the nose 28a of the pivotal latch 28 and it effects a positive engagement of the pin 25 in the recess 14c of the tongue 14 with the consequence of prevention of any rotational movement whatsoever as well as the pivotal movement of the lever 9 connected therewith.

If the tension cable 23 is again released after the return tipping of the back rest into the initial position, then the return spring 24 effects a pivotal motion of the lock latch 21 into the position illustrated in FIG. 2 of the drawings by continuous lines. In this configuration the pin 25a releases the pivotal latch 28, so that the pivotal lever 9 can again be actuated.

We claim:

1. In a vehicle seat fitting, the seat incorporating means for height adjustment of the seat part, means for tilting adjustment motion of the backrest and means for foreward folding of the backrest,
    a lever pivotal from a neutral position selectively into one or other of two end positions, one said end position enabling height adjustment of the seat part, by the height adjustment means, and the other said end position enabling adjustment of the inclination of the back rest by the tilting adjustment means,
    a locking means for restraining foreward folding of the backrest, and
    arrest means functionally connected with the locking means and operative to arrest motion of the pivotal lever whenever the locking means are in their release configuration so as to prevent movement of the lever into either of said end positions.

2. A vehicle seat fitting according to claim 1, comprising
    a pair of plates receiving between them an upright member of the back rest,
    the pivotal lever being constructed as a two-armed lever, one of which arms being pivoted to one of the plates,
    a tongue pivotally mounted on the fitting which can be moved into one of the end positions of the lever in accordance with the degree of motion of the lever, and
    a pin and slot connection operative to connect one arm of the two-armed lever to said tongue.

3. A vehicle seat fitting according to claim 2 comprising
    a pin of the pin and slot connection mounted on the tongue,
    one arm of the two-armed lever having the slot of the pin and slot connection formed therein.

4. A vehicle seat fitting according to claim 2 wherein said locking means comprises
    a pin mounted on the seat part,
    a lock latch pivoted to one of said plates, the fitting having a recess, partly defined by said lock latch, into which recess said pin can engage and
    a cable guided within the backrest for changing over the lock latch to a release configuration whereby the pin is released from said recess so that the backrest can be tilted forwardly.

5. A fitting according to claim 4, comprising a return spring acting on the lock latch which serves to return it to the release condition in the recess of the fitting.

6. A fitting according to claim 2 wherein the tongue takes the form of a two-armed lever.

7. A fitting according to claim 6, wherein a recess is provided in one arm of the tongue, in which recess the arrest means can positively engage.

8. A fitting according to claim 7, wherein the arrest means comprises a pin engageable in said recess in one of the arms of the tongue.

9. A fitting according to claim 8, wherein the pin is connected with the lock latch.

10. A fitting according to claim 8, comprising
    a pivotal latch, and
    a return spring acting on the latch,
    said pin being mounted on the pivotal latch, and
    the pin being held, in the arrest configuration, by the pin connected with the lock latch.

11. A fitting according to claim 2 wherein the arrest means comprises
    a positively-guided slide pivotally connected with the lock latch.

12. A fitting according to claim 11 comprising
    a pin and slot connection providing said positive guidance, said connection including
    a pin connected to one plate of the fitting and
    means defining a slot in one end of the slide and engaged with the pin.

13. A fitting according to claim 2, wherein the tongue is formed as a single-armed lever, and the fitting comprises
    a pin rotatably mounted in the fitting and connected with the tongue, and
    a link in pivotal connection with the lock latch.

14. A fitting according to claim 13, wherein the link is pivoted on the rotatable pin and wherein the pin has a flat which in the arrest configuration of the lever engages positively in a corresponding recess in the link.

* * * * *